United States Patent
Weinberg et al.

(10) Patent No.: US 10,945,385 B2
(45) Date of Patent: Mar. 16, 2021

(54) STUMP CUTTER TOOTH

(71) Applicant: VERMEER MANUFACTURING COMPANY, Pella, IA (US)

(72) Inventors: Clint A. Weinberg, Pella, IA (US); Gary W. Kappel, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 216 days.

(21) Appl. No.: 16/033,667

(22) Filed: Jul. 12, 2018

(65) Prior Publication Data
US 2020/0015435 A1 Jan. 16, 2020

(51) Int. Cl.
*A01G 23/06* (2006.01)

(52) U.S. Cl.
CPC .................. *A01G 23/067* (2013.01)

(58) Field of Classification Search
CPC .............. A01G 23/06; A01G 23/067
See application file for complete search history.

(56) References Cited

U.S. PATENT DOCUMENTS

| | | |
|---|---|---|
| 4,974,746 A | 12/1990 | Dickinson |
| 4,998,574 A | 3/1991 | Beach et al. |
| 5,279,345 A | 1/1994 | LeMaux et al. |
| 5,497,815 A | 3/1996 | Bowling |
| 5,743,314 A | 4/1998 | Puch |
| 6,024,143 A | 2/2000 | Ritchey |
| 6,382,277 B1 | 5/2002 | Paumier et al. |
| 6,848,485 B1 | 2/2005 | Paumier et al. |
| 7,124,795 B2 * | 10/2006 | Kammerer .......... A01G 23/067 144/241 |
| 7,299,836 B2 | 11/2007 | Green |
| 7,418,986 B2 | 9/2008 | Watts |
| 8,020,591 B2 | 9/2011 | Kappel et al. |
| 8,123,302 B2 | 2/2012 | Hall et al. |
| 8,215,420 B2 | 7/2012 | Hall et al. |
| 8,522,843 B2 | 9/2013 | Kappel et al. |
| 8,672,001 B2 | 3/2014 | Leonardi et al. |
| 8,789,566 B2 | 7/2014 | Leonardi et al. |
| 2007/0193428 A1 * | 8/2007 | MacLennan .......... B27B 33/144 83/840 |
| 2010/0218851 A1 | 9/2010 | Leonardi et al. |
| 2014/0319261 A1 * | 10/2014 | Paros ................... A01G 23/067 241/300 |

OTHER PUBLICATIONS

Green Manufacturing, Inc. Morenci, MI "Greenteeth Productline" information Publication Date of Dec. 31, 2012.

* cited by examiner

*Primary Examiner* — Matthew Katcoff
(74) *Attorney, Agent, or Firm* — Sturm & Fix LLC

(57) ABSTRACT

A stump cutter tooth with an angled or tapered cutting face, the purpose of the angle or taper being to increase the efficiency of the cutting tooth and lower the forces thereof that get transferred back to a stump cutter machine, the tooth also tapering to a full width required to protect a pocket or a mount from contact with a stump.

19 Claims, 9 Drawing Sheets

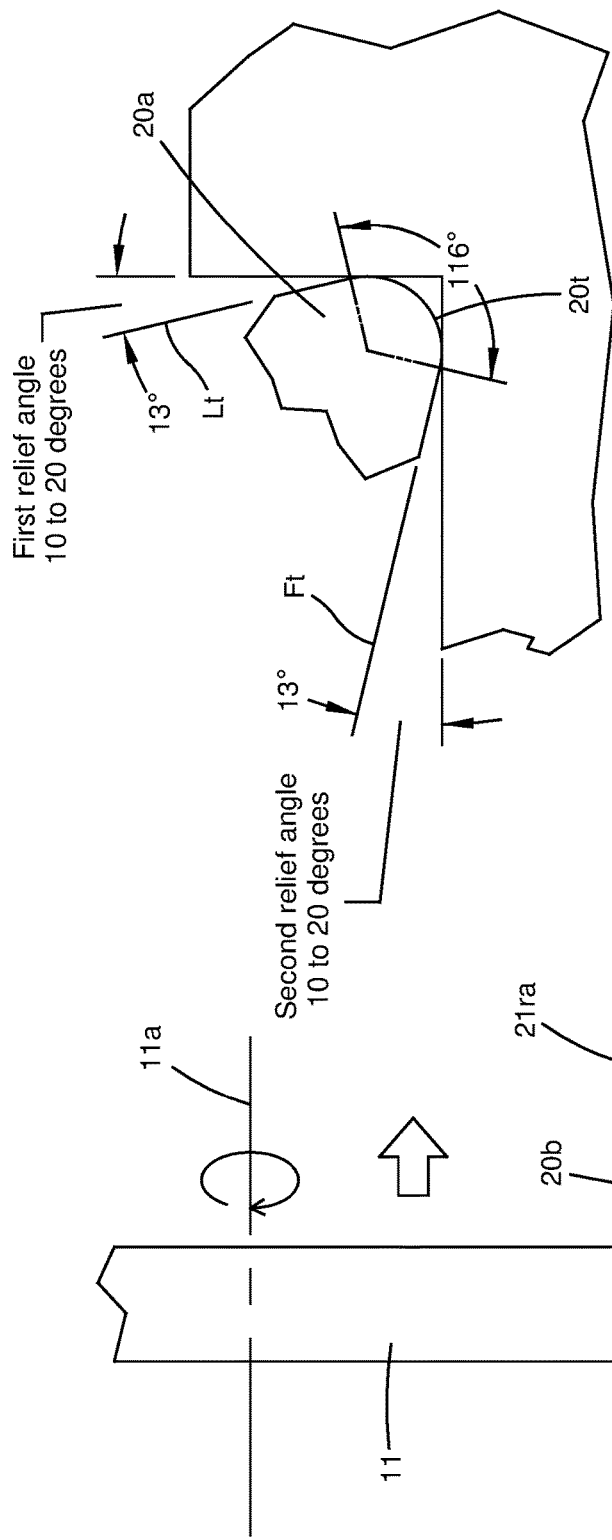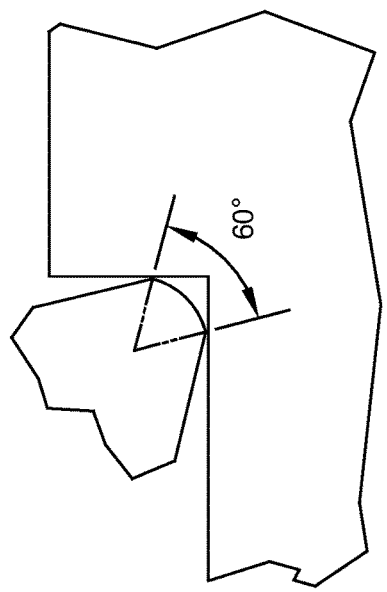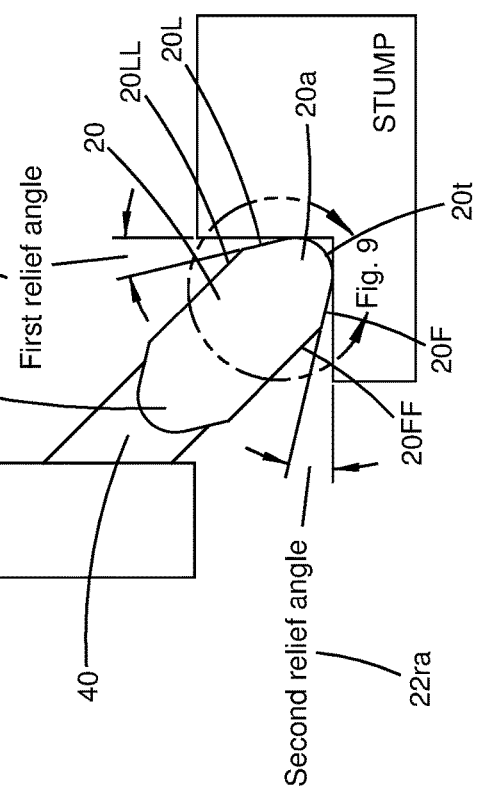

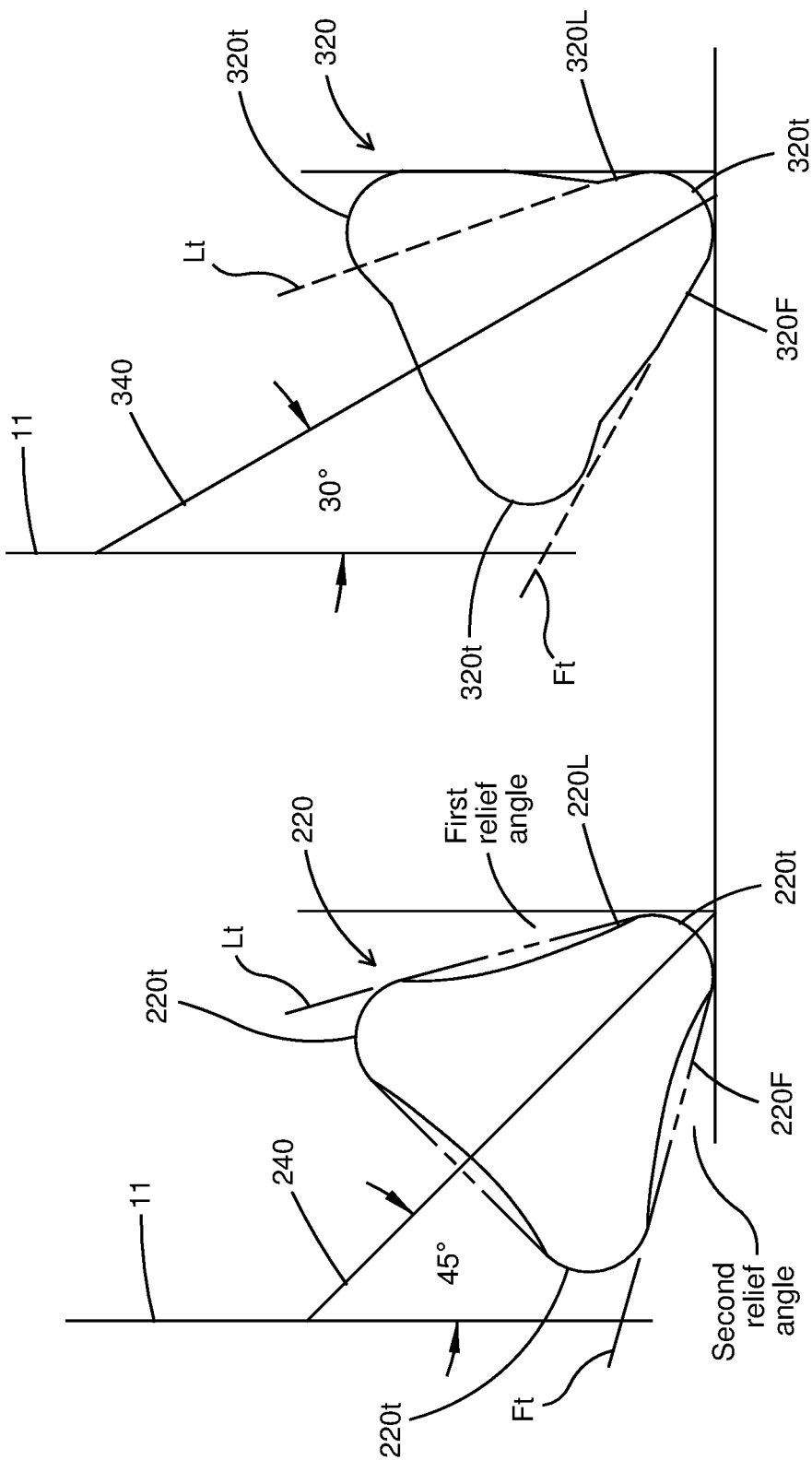

STUMP CUTTER TOOTH

CROSS REFERENCE TO RELATED APPLICATIONS

A U.S. utility patent application jointly owned by Kennametal, Inc. and Vermeer Mfg. Co. Inc., entitled Stump Cutter Tooth Assembly with Anti-Rotation and Locating Feature given Ser. No. 16/033,325 and Conf. No. 3653, and a design patent application jointly owned by Kennametal, Inc. and Vermeer Mfg. Co. Inc, entitled Stump Cutter Tooth given Serial No. 29/656,368 and Conf. No. 1083, were both filed the same day that this instant application was filed, which applications are hereby incorporated herein by reference in their entirety.

BACKGROUND OF THE INVENTION

The present invention relates generally to an improved stump cutter tooth and more particularly to a stump cutter tooth that is more efficient than prior art stump cutter teeth.

The old methods to perform the purpose of this invention are to use a tooth having an elongated structure with a rounded end, as shown in FIG. 3, or to use a circular tooth as shown in FIG. 6. Many configurations of the elongated structure have been used including that illustrated in FIG. 3 with a support structure angled at 30 degrees from a stump cutter wheel, with the elongated axis of the tooth being parallel to that support structure, and the tip being an arc extending through a subtended central angle of 180 degrees.

Another example of this elongated type tooth, and a support structure, is described in U.S. Pat. Nos. 8,522,843 and 8,020,591 to Kappel et al. (both incorporated herein by reference), the detailed tip of that embodiment shown herein in FIGS. 4 and 5 with a rounded tip that has an arc extending through a subtended central angle of approximately 125 degrees, where an arcuate tip transitions to the elongated side of the wide tooth, as pictured in FIG. 4 with the supporting structure angled at 45 degrees from a stump cutter wheel. This type of elongated tooth can also be mounted at 180 degrees as shown in FIG. 5, where it is intended to cut at the outer-most diameter of the stump cutter wheel, and where it is expected to engage the stump in a slightly different manner.

A circular shaped carbide tooth as shown in FIGS. 6 and 7, are also known, having a radius similar in dimension to the radii shown in FIGS. 3-5. The circular shaped carbide tooth shown in FIGS. 6 and 7 has only a circular shape and no angled straight edge in its geometry for example as shown in Puch's U.S. Pat. No. 5,743,314 (incorporated herein by reference), and can be mounted on a support structure mounted at an angle to a stump cutter wheel and positioned to cut to the side of the wheel as shown in FIG. 6, or mounted on a support structure mounted at 180 degrees, and positioned to cut at the outer-most diameter of the stump cutter wheel, as shown in FIG. 7.

BRIEF SUMMARY OF THE INVENTION

The purpose of this invention is to create a stump cutter tooth with an angled or tapered cutting face. The purpose of the angle or taper is to increase the efficiency of the cutting tooth and lower the forces thereof that get transferred back to the machine. This efficiency is achieved by angling or tapering the tooth, which benefits from attaining relief earlier in the cutting action than previous geometries. This effect is ideal for light weight equipment, and low horsepower machines.

This invention is primarily focused on the geometry that engages the material, such as a stump, during operation. A stump cutter tooth, adapted to be mounted to a stump cutter wheel rotatable about a horizontal axis is configured so that an effective cutting edge will be positioned for engagement with a stump to cut on a leading side in a vertical plane and on a following side in a horizontal plane. The effective cutting edge, when the tooth is positioned for engagement with a stump, has a tip edge extending from a leading point to a following point generally co-incident with an arc, where the arc subtends its central angle ranging between 60 and less than 120 degrees. The center of the tip circle is within a tooth body. A leading edge on the leading side of the cutting edge may be coincident with a leading tangent line, tangent to the tip circle at the leading point. The leading edge may instead diverge away from the leading tangent line and towards the tooth body. A following edge, on the following side, may be coincident with a following tangent line, tangent to the tip circle at the following point. The following edge may instead diverge away from the following tangent line and towards the tooth body.

In one preferred embodiment, an arc of an arcuate tip of the tooth subtends a central angle of less than 120 degrees, combined with a straight cutting edge that provides relief of between 10 and 20 degrees and also then tapers the elongated tooth to a full width required to protect the pocket or the mount from contact with the stump.

Another preferred embodiment of a stump cutter tooth has an arcuate tip subtending a central angle of less than 180 degrees and a first straight portion having one end disposed adjacent a first side of the arcuate tip, the straight portion being oriented with a relief angle in a range between 10 degrees and 20 degrees from vertical. This another preferred embodiment can optionally further have a second straight portion having one end disposed adjacent a second side of the arcuate tip, the second straight portion being oriented with a relief angle in the range between 10 degrees and 20 degrees from horizontal. Alternatively, still another preferred embodiment can have the first straight portion oriented with a relief angle in a range between 10 degrees and 20 degrees from horizontal and the second side oriented with a relief angle in the range between 10 degrees and 20 degrees from vertical.

Advantages of this invention are that the cutting element has both a smaller radius engaging the material than previous designs, and also has an edge that angles or tapers back toward the mounting hardware. The angled edge decreases the tooth's width as the tooth increases radially. This angled edge achieves relief when cutting through material and also allows for proper hardware size to be used. If there was no angle then the small radius would prevent the use of hardware, due to its narrow width, which can be used for quickly changing teeth once worn. Also, by achieving relief faster the force induced on the tip reduces, which increases the cutting efficiency through the material. This effect is desirable for low horsepower applications because the stump cutter can then cut a competitive depth with less ill effects due to vibration.

Alternative methods include using this same concept of having a smaller initial point of impact on other geometric shapes such as a clover, star, or other configurations. Having a tapered or angled edge allows for smoother operation by reducing the initial impact and gradually working to the full width the deeper the tooth is engaged. The benefits from attaining relief faster when cutting will improve cutting efficiency and transfer less vibration through the machine.

Other objects, advantages and novel features of the present invention will become apparent from the following description of the invention when considered in conjunction with the accompanying drawings.

BRIEF DESCRIPTION OF THE SEVERAL VIEWS OF THE DRAWINGS

FIG. 8 shows a first embodiment of a stump cutter tooth of the present invention and the geometry thereof while cutting a stump;

FIG. 9a is a partial, enlarged, view of FIG. 8 showing a few more details than are shown in FIG. 8;

FIG. 9b to shows a tooth with a 60 degree arc;

FIG. 13 shows a fourth embodiment of a stump cutter tooth of the present invention and the geometry thereof while cutting a stump, including a mounting arm angled at 45 degrees with respect to a plane perpendicular to the rotational axis of the cutter wheel with 3 cutting edges which can be alternatively used;

FIG. 14 shows a fifth embodiment of a stump cutter tooth of the present invention and the geometry thereof while cutting a stump, including a mounting arm angled at 30 degrees with respect to a plane perpendicular to the rotational axis of the cutter wheel with 3 cutting edges which can be alternatively used;

DETAILED DESCRIPTION OF THE INVENTION

Figure 1:
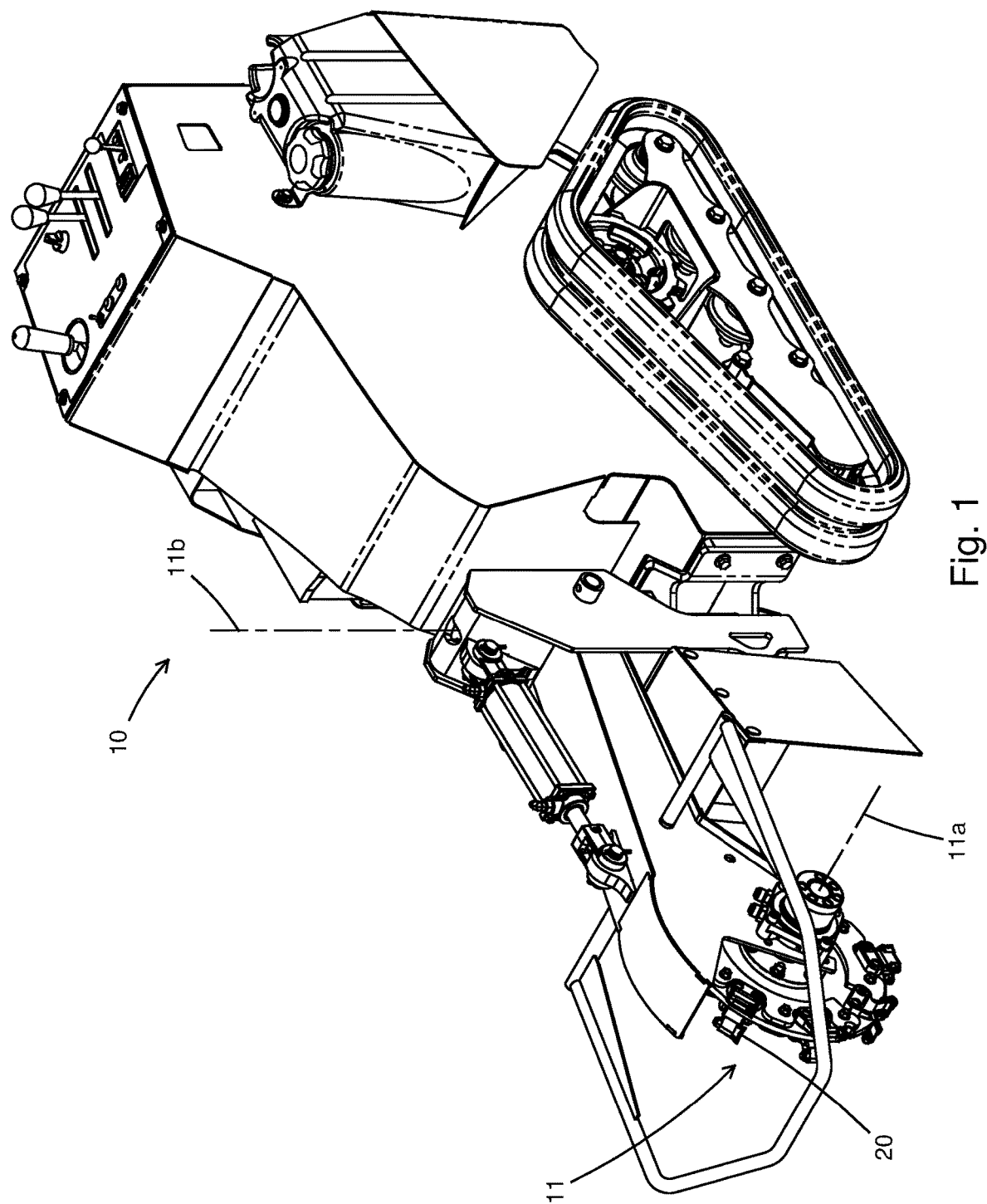
FIG. 1 shows a stump cutter machine having a rotating stump cutter wheel with cutting teeth of the present invention attached thereto.
Figure 2:
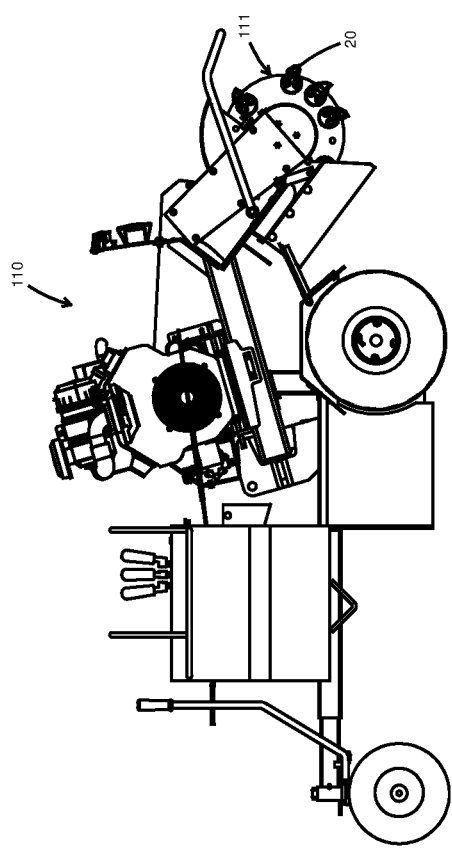
FIG. 2 shows a side elevational view of another stump cutter machine having stump cutter teeth of the present invention attached to a cutter wheel thereon.
Figure 4:
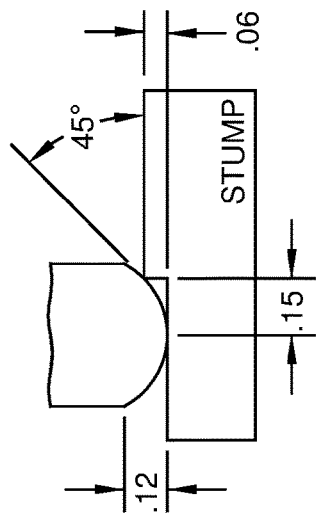
FIGS. 3-7 show prior art stump cutter teeth and the geometry thereof while cutting a stump.
Figure 5:
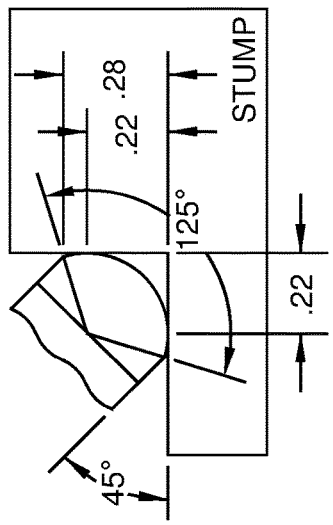
Figure 6:
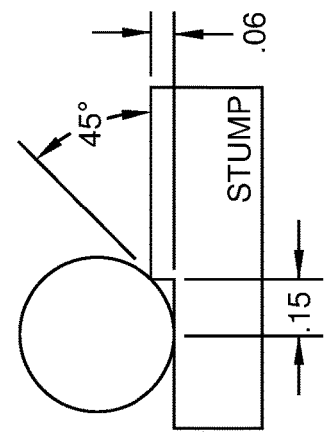
Figure 7:
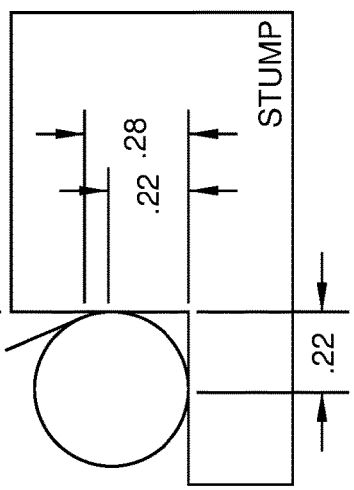
Figure 3:
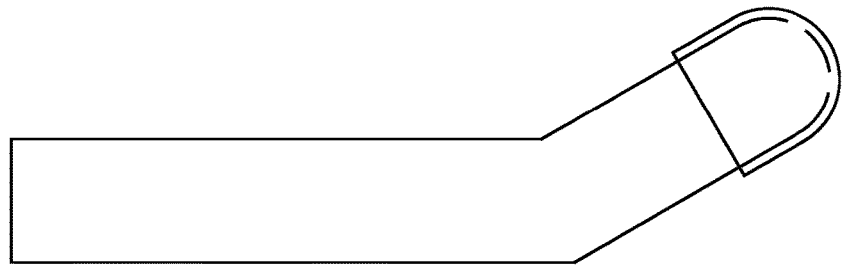
Figure 10:
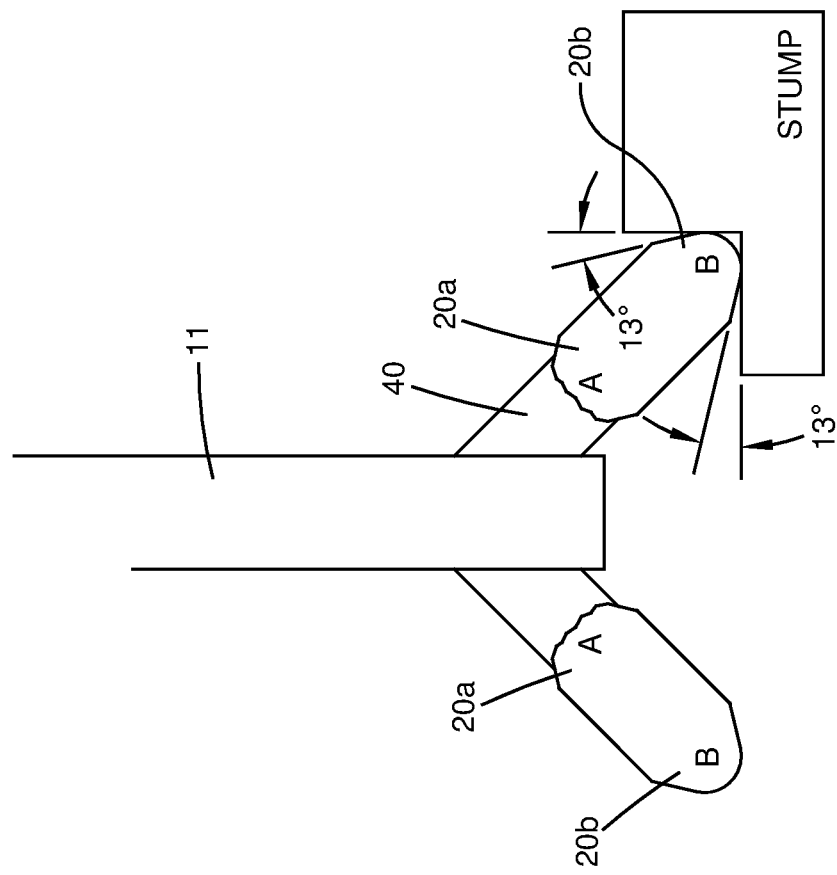
FIG. 10 shows a second embodiment of a stump cutter tooth of the present invention using two reversible teeth edges and the geometry thereof while cutting a stump, including a mounting arm angled at 45 degrees with respect to a plane perpendicular to the rotational axis of the cutter wheel.

Referring now to the drawings, wherein like reference numerals designate identical or corresponding elements throughout the several views, FIG. 1 shows a self-propelled stump cutter 10 having a stump cutter wheel 11 on the front thereof which rotates about a substantially horizontal axis 11a as it sweeps towards a stump to be ground by being pivoted along substantially vertical axis 11b as is well known in this art. FIG. 2 shows a self-propelled stump cutter 110, with a stump cutter wheel 111 and stump cutter teeth 20.

The heart of the present invention resides in the configuration of the teeth shown in FIGS. 8-19 and their orientation as the stump cutter wheel rotates and sweeps to one side towards a stump.

Looking to FIGS. 8-10 and 16, teeth 20 are shown in a first reversible embodiment, though the tooth of the present invention in its broadest sense does not need to be reversible. The tooth 20 shown in FIGS. 8-10 and 15 has a working outer end 20a that contacts the stump shown in FIGS. 8-10.

Figure 16:
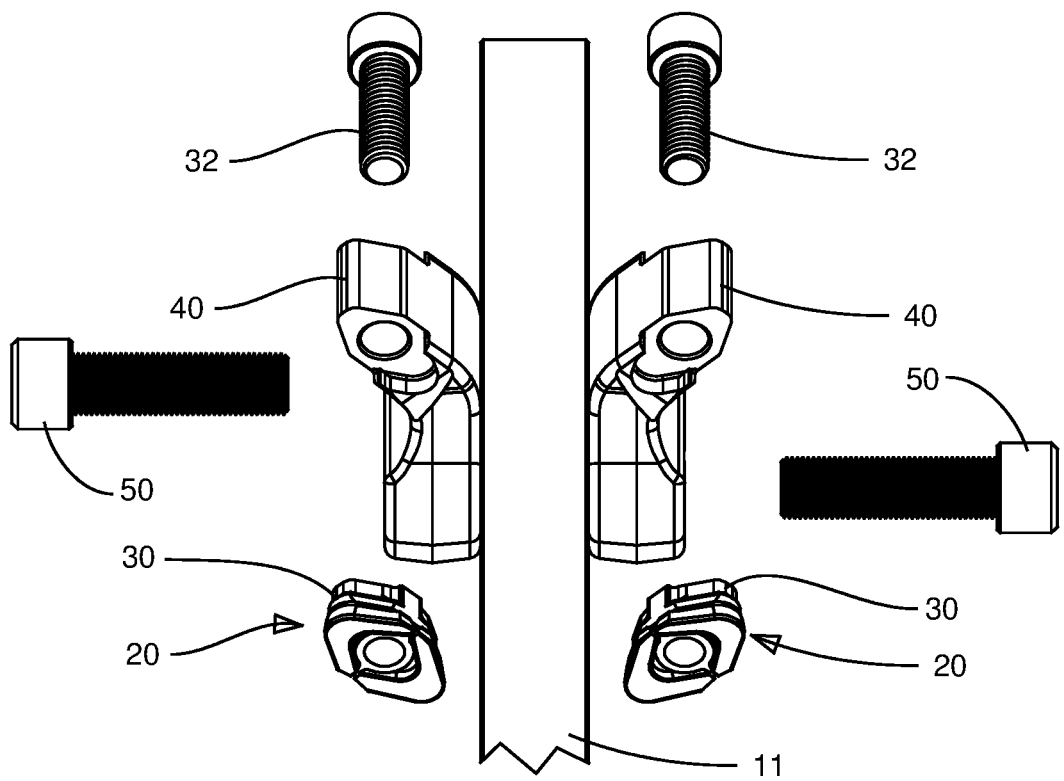
FIG. 16 is an isometric view showing the components of a stump cutter assembly exploded apart from one another in relation to a driven cutting wheel, to show one example of how the teeth of the present invention can be attached to the driven cutting wheel.

FIG. 16 shows tooth mount 30, which is part of the tooth 20. The tooth mount 30 attaches to a holder 40. The details of the tooth mount 30 and holder 40 shown in the drawings will be explained generally below, but it is to be understood that the details of their construction are not a part of this invention. It would be possible to make tooth parts 20a and 20b of tooth 20 as a single component, but the tooth parts 20a and 20b will preferably be made from a different material than the tooth mount 30. Tooth parts 20a and 20b are preferably constructed of tungsten carbide and the tooth mount 30 is typically made of a carbon steel alloy.

Figure 11:
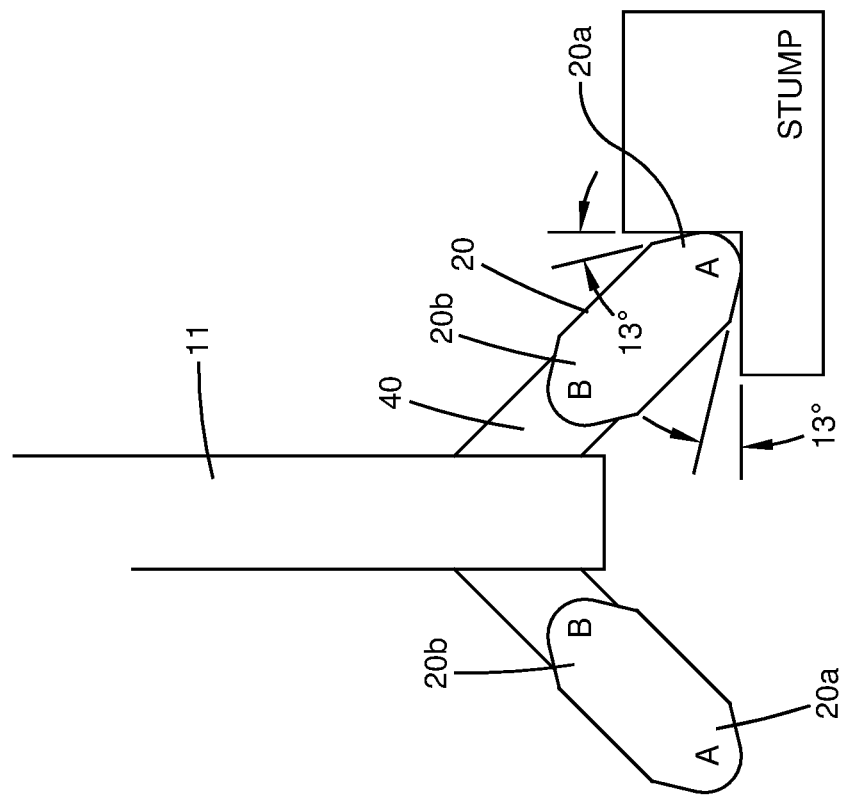
FIG. 11 shows the second embodiment of a stump cutter tooth of FIG. 10 but showing how the working surface of the stump cutter tooth has been flipped to use a second tooth edge "B" after the first tooth edge "A" has become worn or damaged.

Referring again to FIGS. 15 and 16, the tooth mount 30 part of tooth 20 is attached to the rest of the tooth 20 in any suitable way, including but not limited to welding, which can include the way shown in prior art U.S. Pat. No. 8,522,843 to Kappel et al. A preferred way of connecting the tooth 20 to the cutting wheel 11/111 is shown in FIG. 16, an invention claimed in a US patent application filed by Applicant Kennametal, Inc., entitled Stump Cutter Tooth Assembly with Anti-Rotation and Locating Feature, and a design patent application jointly owned by Kennametal, Inc. and Vermeer Mfg. Co. Inc, entitled Stump Cutter Tooth, both filed the same day that this instant application was filed, and which applications are incorporated herein by reference in their entirety. When the tooth part 20a becomes worn down, the tooth 20 would be detached by unthreading the tooth 20 from the internally threaded mount 30 portion of tooth 20 (FIG. 16) from a tooth mount bolt 32. After the tooth mount bolt 32 is removed, the tooth 20 would then be rotated and then repositioned in holder 40, resulting in the tooth 20 being flipped to the position shown in FIG. 11. After such repositioning of the tooth 20, tooth part 20b would then be in a stump cutting position as shown in FIG. 11. FIG. 11 shows that when tooth part 20a is worn down, it has been removed from the FIG. 10 position, flipped 180 degrees, and reinstalled on holder 40 so that tooth part 20*b* becomes the part that grinds the stump instead of tooth part 20*a*. It can also be seen in FIG. 16 that the holders 40 are attached to the cutting wheel 11 using threaded bolts 50.

The tooth 20 is, of course, hardened and is made large enough to protect the tooth mount portion 30 thereof and the part of the holder 40 that passes behind the tooth 20 from wear as the tooth 20 rotates in a circle about rotational axis 11*a* of the stump cutter wheel 11. These last two features mentioned not being essential to the invention but merely making the parts shown in FIG. 16 last longer than they would otherwise.

Looking again at FIGS. 8 and 9*a*, the stump cutter wheel 11 and holder 40 are shown schematically because it is not important how the tooth 20 is held in the relationship shown with respect to the stump cutter wheel 11 and stump, but only that it is in that relationship as the stump cutter wheel 11 rotates in a direction so the tooth is leading the rotation and that the stump cutter wheel is moving sideways toward the uncut part of the stump. As that occurs there is a leading first relief angle 21*ra* between 10 and 20 degrees between vertical and a leading planar surface 20L (also referred to as leading straight wall, leading flat wall, or leading planar wall) and a second relief angle 22*ra* between 10 and 20 degrees from horizontal and the following planar surface 20F (also referred to as following straight wall, following flat wall, or following planar wall).

Looking to FIG. 9*a*, it is shown that a line from the center of the arc of the tip 20*t* to the place where the arc of the tip 20*t* meets the leading planar surface 20L and the center of the arc of the tip 20*t* to the place where the arc of the tip 20*t* meets the following planar surface 20F is more than 90 degrees, and is in fact the sum of 90 degrees plus the amounts of the first and second relief angles, i.e. 90+13+13=116 degrees as indicated on FIG. 9*a*. The line Lt is there to show that the plane of the leading planar surface 20L is tangent to the arc of tip 20*t* and that such tangent line Lt is 13 degrees from vertical. Similarly, the line Ft is there to show that the plane of the following planar surface 20F is tangent to the arc of tip 20*t* and that such tangent line Ft is 13 degrees from horizontal. It is important to note that while the holder 40 in FIG. 8 is shown extending from the stump cutter wheel at 45 degrees, that fact is not important as long as ultimately the tip 20*t* and leading planar surface 20L of the tooth 20 are in the relationship of an arcuate tip 20*t* subtending a central angle of less than 180 degrees and the leading planar surface 20L having one end disposed adjacent a first side of the arcuate tip 20*t*, the leading planar surface 20L being oriented with a relief angle in a range between 10 degrees and 20 degrees from vertical, 13 degrees being shown as one example of that relief angle.

Looking still at FIGS. 8 and 9*a*, a following planar surface 20F is positioned to form the second relief angle between it and a horizontal plane. The line Ft shown in FIG. 9*a* is a line tangent to the arc of tip 20*t* where the following planar surface 20F meets the following part of the arc of tip 20*t* so that the effective edge further comprises the following planar surface 20F having one end disposed adjacent a second following side of the arcuate tip 20*t*, the following planar surface 20F being oriented with a relief angle in the range between 10 degrees and 20 degrees from horizontal, the example shown in FIGS. 8 and 9 being 13 degrees.

FIG. 8 also shows a stump cutter tooth comprising an arcuate tip 20*t* connected on each respective side thereof by the leading planar surface 20L and the following planar surface 20F and then continued with second two generally parallel surfaces 20LL/20FF connected respectively to the two aforementioned planar surfaces 20L/20F. The arcuate tip 20*t* forms an effective cutting edge and wherein the stump cutter tooth 20 is adapted to be mounted to a stump cutter wheel 11, rotatable about a horizontal axis, in a manner that the effective cutting edge 20*t* is positioned for engagement with a stump, to cut in a vertical direction. While not completely necessary, the two generally parallel surfaces are parallel in a preferred embodiment.

FIG. 9*b* shows a tooth constructed in accordance with the present invention that has a 60 degree subtended central angle of the arc.

Figure 12:
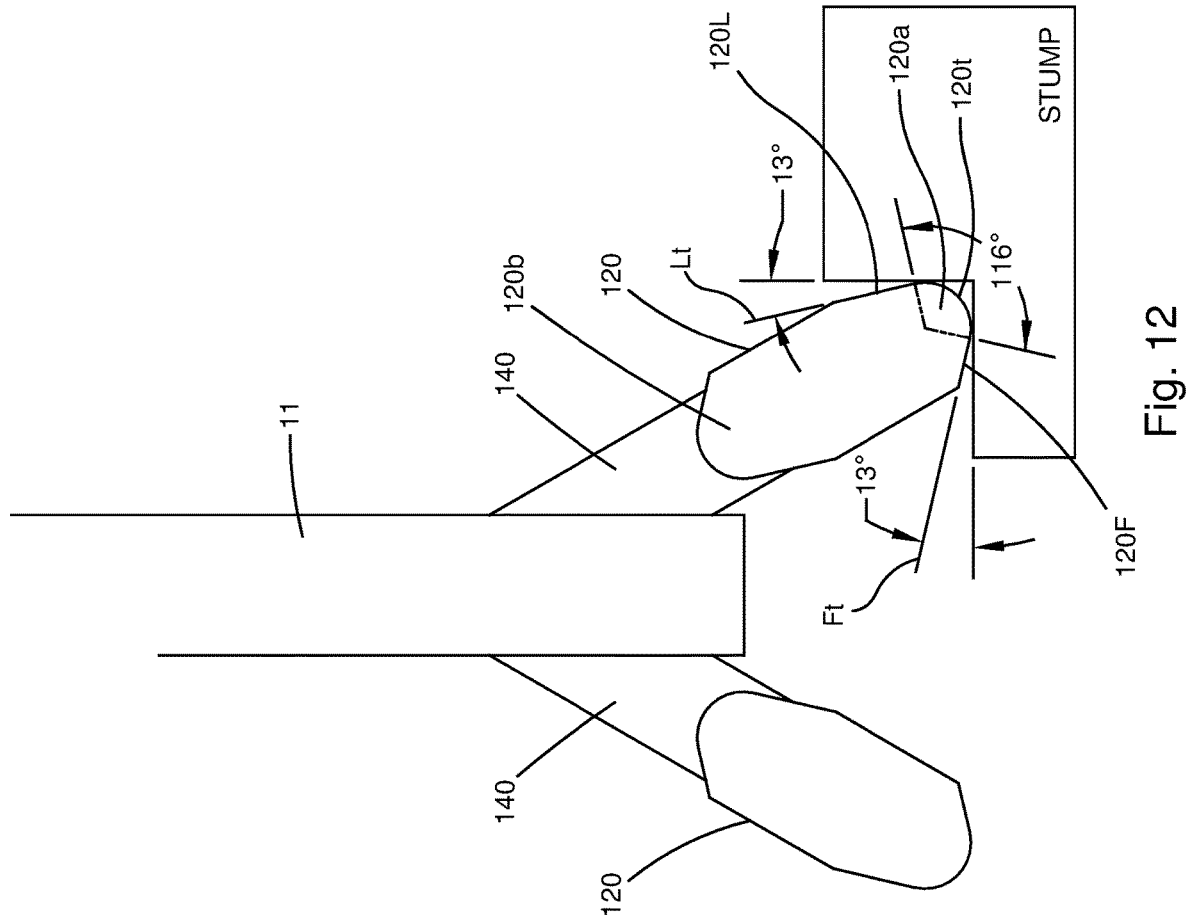
FIG. 12 shows a third embodiment of a stump cutter tooth of the present invention and the geometry thereof while cutting a stump, including a mounting arm angled at 30 degrees with respect to a plane perpendicular to the rotational axis of the cutter wheel.

Looking now to FIG. 12, shows an alternate embodiment of stump cutter tooth 120 attached to the stump cutter wheel 11 by a holder 140 that is angled at 30 degrees from a plane perpendicular to the rotational axis of the stump cutter wheel 11, as contrasted from the holder 40 shown in FIG. 8 which orients the holder 40 at 45 degrees from a plane perpendicular to the rotational axis of the stump cutter wheel 11. It is important to note that this angle of orientation of the holder 40 with respect to a plane perpendicular to the rotational axis of the stump cutter wheel 11, is not critical. It is just important that the tooth 120 is held so that ultimately the tip 120*t* and leading planar surface 120L of the tooth 120 are in the relationship of an arcuate tip 120*t* subtending a central angle of less than 180 degrees and the leading planar surface 120L having one end disposed adjacent a first side of the arcuate tip 120*t*, the leading planar surface 120L being oriented with a relief angle in a range between 10 degrees and 20 degrees from vertical, 13 degrees being shown as one example of that relief angle.

Looking still at FIG. 12, a following planar surface 120F is positioned to form the second relief angle between it and a horizontal plane. The line Ft shown in FIG. 12 is a line tangent to the arc of tip 120*t* where the following planar surface 120F meets the following part of the arc of tip 120*t* so that the effective edge further comprises the following planar surface 120F having one end disposed adjacent a second following side of the arcuate tip 120*t*, the following planar surface 120F being oriented with a relief angle in the range between 10 degrees and 20 degrees from horizontal, the example shown in FIG. 12 being 13 degrees.

Looking now to FIG. 13, shows an alternate embodiment of stump cutter tooth 220 being attached to the stump cutter wheel 11 by a holder 240 that is angled at 45 degrees from a plane perpendicular to the rotational axis of the stump cutter wheel 11, as contrasted from the holder 140 shown in FIG. 12 which orients the holder 40 at 30 degrees from a plane perpendicular to the rotational axis of the stump cutter wheel 11. It is important to note that this angle of orientation of the holder 40 with respect to the plane perpendicular to the rotational axis of the stump cutter wheel 11, is not critical. It is just important that one of the three edges of the tooth 220 is held so that the tip 220*t* and a leading plane 220L of the tooth 220 are in the relationship of an arcuate tip 220*t* subtending a central angle of less than 180 degrees and the leading plane 220L having one end disposed adjacent a first side of the arcuate tip 220*t*, the leading plane 220L being oriented with a relief angle in a range between 10 degrees and 20 degrees from vertical.

Looking still at FIG. 13, a following plane 220F is positioned to form the second relief angle between it and a horizontal plane. The line Ft shown in FIG. 13 is a line tangent to the arc of tip 220*t* where the following plane 220F meets the following part of the arc of tip 220*t* so that the effective edge further comprises the following plane 220F having one end disposed adjacent a second following side of the arcuate tip 220t, the following plane 220F being oriented with a relief angle in the range between 10 degrees and 20 degrees from horizontal.

Looking now to FIG. 14, an alternate embodiment of stump cutter tooth 320 is shown attached to the stump cutter wheel 11 by a holder 340 that is angled at 30 degrees from a plane perpendicular to the rotational axis of the stump cutter wheel 11, as contrasted from the holder 240 shown in FIG. 13 which orients the holder 240 at 45 degrees from a plane perpendicular to the rotational axis of the stump cutter wheel 11. As mentioned above, it is important to note that this angle of orientation of the holder 340 with respect to the plane perpendicular to the rotational axis of the stump cutter wheel 11, is not critical. It is just important that one of the three operative edges of the tooth 320 are held so that the tip 320t and leading planar surface 320L of the tooth 320 are in the relationship of an arcuate tip 320t subtending a central angle of less than 180 degrees and the leading planar surface 320L having one end disposed adjacent a first side of the arcuate tip 320t, the leading planar surface 320L being oriented with a relief angle in a range between 10 degrees and 20 degrees from vertical.

Looking still at FIG. 14, a following planar surface 320F is positioned to form the second relief angle between it and a horizontal plane. The line Ft shown in FIG. 14 is a line tangent to the arc of tip 320t where the following planar surface 320F meets the following part of the arc of tip 320t so that the effective edge further comprises the following planar surface 320F having one end disposed adjacent a second following side of the arcuate tip 320t, the following planar surface 320F being oriented with a relief angle in the range between 10 degrees and 20 degrees from horizontal.

Figure 15:
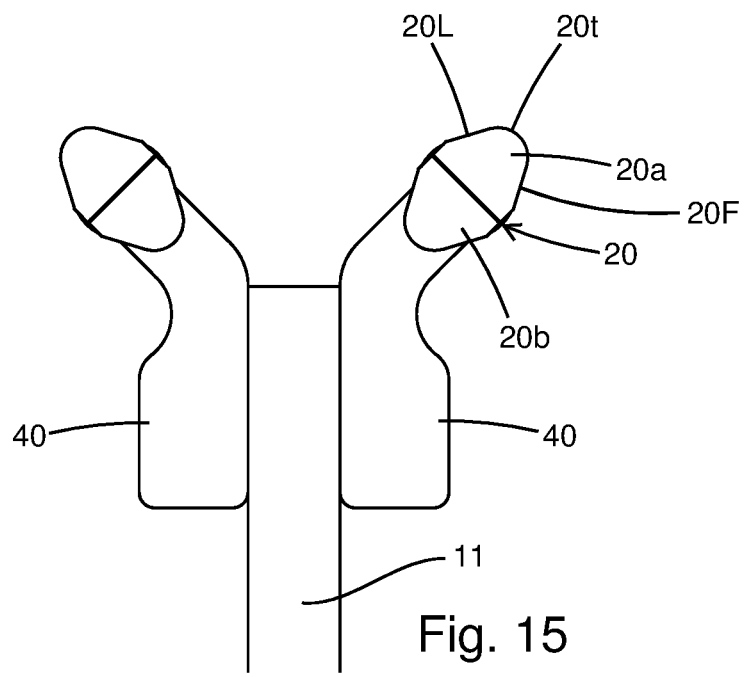
FIG. 15 is a partial enlarged view of an outer portion of a cutter wheel of a stump cutter having two tooth holders attached thereto with a tooth in each of the holders.

It will be appreciated that the indexing system shown in FIGS. 15 and 16 is used in a modified form in the FIGS. 13 and 14 embodiments whereby any form of anti-rotation system can be used to hold the tooth 220/320 in one of three possible positions. Once one of the tips 220t/330t is worn out, the tooth can be removed from the holder 240/340, rotated appropriately, and then secured in place so that an unworn one of the three tips 220t/320t can be used instead of a worn one.

Figure 17:
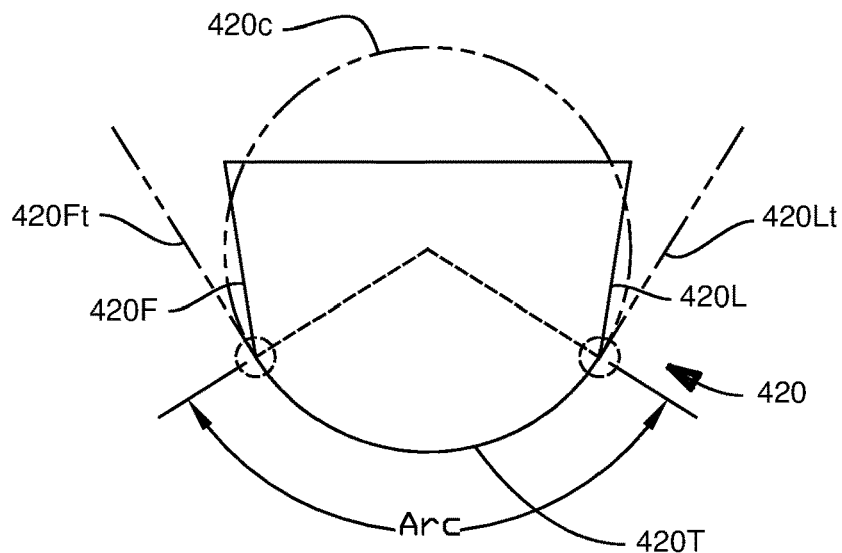
FIG. 17 is similar to the FIGS. 8-14 embodiments but the relief is provided using a tip with straight leading and following edges that are not tangential to the arcuate tip.

The FIG. 17 tooth 420 is similar to the tooth of the FIGS. 8-14 embodiments but the needed relief is provided using a tip 420T with straight edges 420L and 420F that are not tangential to the arcuate tip 420T. The arc of the arcuate tip 420T of the tooth of FIG. 17 subtends a central angle ranging from 60 to less than 120 degrees, noting that while a 60 degree subtended central angle is not shown in FIG. 17, FIG. 9b shows a similar embodiment that has a 60 degree subtended central angle. The dashed lines 420Lt and 420Ft shown in FIG. 17 are lines tangent to the arc of the tooth circle 420c at the extreme ends of the arc of the tooth 420.

Figure 18:
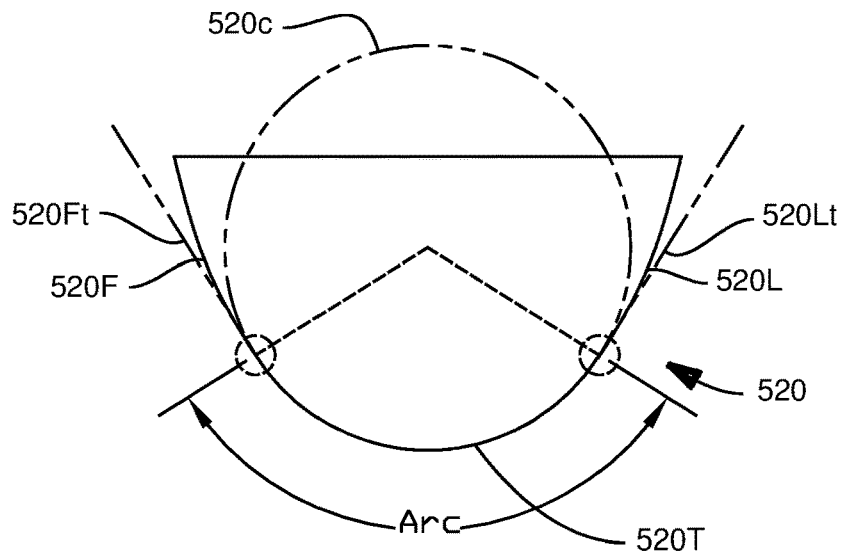
FIG. 18 shows a tooth providing the desired relief by using arcs on the leading and following edges in place of the straight edges of FIGS. 8-14, which arcs are tangent to the arc of the arcuate tip, the relief angles being created by a line that intersects where the arc of the tip meets the arc of the leading or following edges, and runs tangent to them respectively.

FIG. 18 shows a tooth 520 providing the desired relief by using arcs 520L and 520F in place of the straight edges. The arcs 520L and 520F are tangent to the arcuate tip 520T at the extreme ends of arcuate tip 520T. The arc of the arcuate tip 520T of the tooth of FIG. 18 subtends a central angle ranging from 60 to less than 120 degrees. Relief angles of 10 to 20 degrees are created by a line that intersects where the two arcs 520L and 520F meet the extreme ends of arcuate tip 520T, and runs tangent to them. See tangent lines 520Lt and 520Ft.

Figure 19:
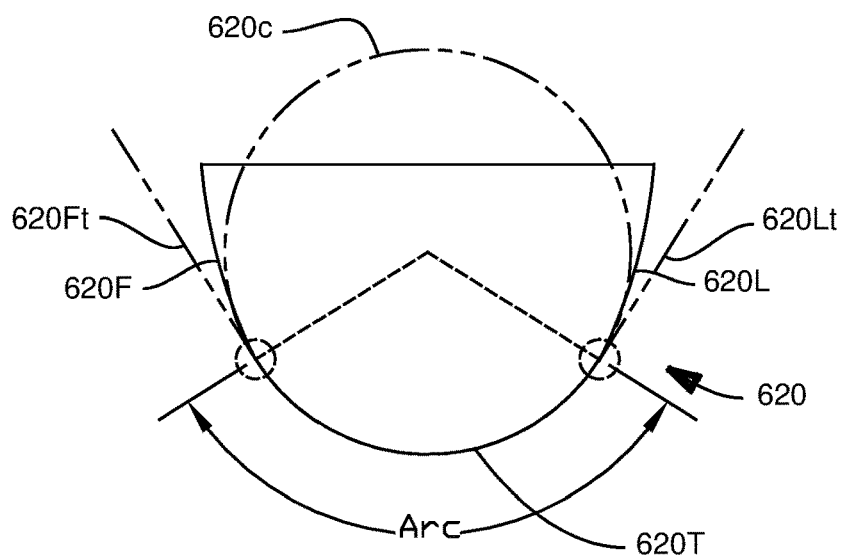
FIG. 19 shows a tooth similar to the tooth of FIG. 18, but the relief arcs are not tangent to the arcuate tip, the relief lines being created by a line that intersects where the leading and following edge arcs meet the tip arc, respectively, and is perpendicular to a line extending from the center of a circle coincident with the arcuate tip to an endpoint of the arcuate tip.

Referring, finally, to FIG. 19, a tooth 620 is shown that is similar to the tooth 520 of FIG. 18, but a leading relief arc 620L and a following relief arc 620F are not tangent to the arcuate tip 620T. The arc of the arcuate tip 620T of the tooth of FIG. 19 subtends a central angle ranging from 60 to less than 120 degrees about a center of tooth circle 620c. The relief lines 620Lt and 620Ft are created by lines that intersects where the leading relief arc 620L and the following relief arc 620F meet arcuate tip 620T. Line 620Lt is a line perpendicular to a line extending from the center of the tooth circle 620c to the end of the arc of the arcuate tip 620T where it meets the leading relief arc 620L. Line 620Ft is a line perpendicular to a line extending from the center of the tooth circle 620c to the end of the arc of the arcuate tip 620T where it meets line the following relief arc 620F.

Obviously, many modifications and variations of the present invention are possible in light of the above teachings. It is therefore to be understood that, within the scope of the appended claims, the invention may be practiced otherwise than as specifically described.

We claim:

1. A stump cutter tooth comprising:
a convex cutting edge configured to cut on a horizontal plane while simultaneously cutting on a vertical plane, the convex cutting edge extending from a leading point to a following point generally coincident with an arc;
a first straight relief edge oriented at a first relief angle of between 10 and 20 degrees from vertical;
a second straight relief edge oriented at a second relief angle of between 10 and 20 degrees from horizontal;
the convex cutting edge being in a tangential relationship to the first straight relief edge and in a tangential relationship to the second straight relief edge; and
wherein a subtended central angle measures less than 120 degrees and is equal to the first relief angle plus 90 degrees plus the second relief angle.

2. A stump cutter tooth comprising an arcuate tip connected on each respective side thereof by two non-parallel straight surfaces and then continued with second two generally parallel surfaces connected respectively to the two non-parallel straight surfaces, the arcuate tip having a subtended central angle less than 145 degrees and forming an effective cutting edge and wherein the stump cutter tooth is configured to be mounted to a stump cutter wheel rotatable about a horizontal axis in a manner that the effective cutting edge is positioned for engagement with a stump, to cut in a vertical direction.

3. The stump cutter tooth of claim 2 wherein the two generally parallel surfaces comprise two straight parallel lines.

4. Apparatus comprising:
a stump cutter wheel adapted to be rotated about a substantially horizontal axis;
a plurality of stump cutter teeth operatively attached to the stump cutter wheel, at least one of said stump cutter teeth comprising:
an arc of an arcuate tip subtending a central angle of less than >0 degrees, said arcuate tip being configured to cut on a horizontal plane while simultaneously cutting on a vertical plane; and
a first planar surface having one end disposed adjacent a first side of the arcuate tip, the first planar surface being oriented with a relief angle in a range between 10 degrees and 20 degrees from vertical.

5. The stump cutter tooth of claim 4 wherein the at least one of said stump cutter teeth further comprises a second planar surface having one end disposed adjacent a second side of the arcuate tip, the second planar surface being oriented with a relief angle in the range between 10 degrees and 20 degrees from horizontal.

6. The stump cutter tooth of claim 4 wherein the arc of the arcuate tip subtends a central angle of less than 120 degrees.

7. Apparatus comprising: a stump cutter having a frame;
a stump cutter wheel operatively rotatably attached to the frame about a substantially horizontal axis;
a plurality of stump cutter teeth operatively attached to the stump cutter wheel, at least one of said stump cutter teeth having an effective cutting edge comprising:
an arc of an arcuate tip extending from a leading point to a following point and subtending a central angle of less than 120 degrees, said arcuate tip being configured to cut on a horizontal plane while simultaneously cutting on a vertical plane; and;
a first planar surface having one end disposed adjacent a first side of the arcuate tip, the first planar surface being oriented with a relief angle in a range between 10 degrees and 20 degrees from vertical.

8. The stump cutter tooth of claim 7 wherein the effective cutting edge further comprises a second planar surface having one end disposed adjacent a second side of the arcuate tip, the second planar surface being oriented with a relief angle in the range between 10 degrees and 20 degrees from horizontal.

9. The stump cutter tooth of claim 7 wherein the arc of the arcuate tip subtends a central angle of less than 120 degrees.

10. A stump cutter
tooth comprising: a tooth body;
a convex cutting edge disposed to engage with a stump to cut on a leading side of the convex cutting edge in a vertical plane and on a following side of said convex cutting edge in a horizontal plane;
the convex cutting edge having a tip edge extending from a leading point to a following point generally coincident with an arc;
a subtended central angle of the arc measuring between 60 degrees and less than 120 degrees;
a leading tangent ray having a leading initial point coincident with the arc's leading point and extending away from the cutting edge in a direction tangent to the tip edge at the leading point;
a leading edge on the leading side having a first point coincident with the arc's leading point and angled toward the tooth body by a nonnegative leading angle relative to the leading tangent ray;
a following tangent ray having a following initial point coincident with the arc's following point and extending away from the cutting edge in a direction tangent to tip edge at the following point; and
a following edge on the following side having a second point coincident with the arc's following point and angled toward the tooth body by a nonnegative following angle relative to the following tangent ray;
wherein an angle measured between the leading edge and the following edge is less than 90 degrees.

11. The stump cutter tooth of claim 10 wherein the stump cutter tooth is adapted to be mounted to a stump cutter wheel rotatable about a substantially horizontal axis.

12. The stump cutter tooth of claim 10 wherein the leading edge's leading angle relative to the leading tangent ray is zero degrees.

13. The stump cutter tooth of claim 10 wherein the following edge's following angle relative to the following tangent ray is zero degrees.

14. The stump cutter tooth of claim 10 wherein the leading edge is disposed with a leading relief angle in a leading range between 10 degrees and 20 degrees relative to the vertical plane.

15. The stump cutter tooth of claim 10 wherein the following edge is disposed with a following relief angle in a following range between 10 degrees and 20 degrees relative to the horizontal plane.

16. The stump cutter tooth of claim 10 wherein the leading edge on the leading side is concave and the nonnegative leading angle is measured between the leading tangent ray and a tangent to the concave leading side at the leading point.

17. The stump cutter tooth of claim 10 wherein the following edge on the leading side is concave and the nonnegative following angle is measured between the following tangent ray and a tangent to the concave following side at the leading point.

18. The stump cutter tooth of claim 10 wherein the leading edge on the leading side is convex and the nonnegative leading angle is measured between the leading tangent ray and a tangent to the convex leading side at the leading point.

19. The stump cutter tooth of claim 10 wherein the following edge on the leading side is convex and the nonnegative following angle is measured between the following tangent ray and a tangent to the convex following side at the leading point.

* * * * *